United States Patent
Kwak

(10) Patent No.: US 9,142,051 B2
(45) Date of Patent: Sep. 22, 2015

(54) METHOD FOR GENERATING DIGITAL INTERIOR MAP

(75) Inventor: Sung-Hoon Kwak, Daegu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 437 days.

(21) Appl. No.: 13/287,401

(22) Filed: Nov. 2, 2011

(65) Prior Publication Data

US 2012/0166147 A1   Jun. 28, 2012

(30) Foreign Application Priority Data

Dec. 23, 2010 (KR) .................. 10-2010-0133933

(51) Int. Cl.
| | |
|---|---|
| G08G 1/0969 | (2006.01) |
| G06T 11/60 | (2006.01) |
| G08G 1/005 | (2006.01) |
| G01S 19/42 | (2010.01) |
| G06T 11/20 | (2006.01) |
| H04W 4/04 | (2009.01) |

(52) U.S. Cl.
CPC .............. *G06T 11/60* (2013.01); *G01S 19/42* (2013.01); *G06T 11/20* (2013.01); *G08G 1/005* (2013.01); *G08G 1/0969* (2013.01); *H04W 4/04* (2013.01)

(58) Field of Classification Search
None
See application file for complete search history.

(56) References Cited

U.S. PATENT DOCUMENTS

| | | | | |
|---|---|---|---|---|
| 5,394,332 A * | 2/1995 | Kuwahara et al. | ............ | 701/408 |
| 5,470,233 A * | 11/1995 | Fruchterman et al. | ......... | 434/112 |
| 5,537,324 A * | 7/1996 | Nimura et al. | ................ | 701/532 |
| 5,848,373 A * | 12/1998 | DeLorme et al. | ............ | 701/455 |
| 5,848,375 A * | 12/1998 | Nunobiki et al. | ............. | 701/455 |
| 5,884,218 A * | 3/1999 | Nimura et al. | ................ | 701/428 |
| 5,908,465 A * | 6/1999 | Ito et al. | ........................ | 701/532 |
| 6,067,502 A * | 5/2000 | Hayashida et al. | ........... | 701/428 |
| 6,144,920 A * | 11/2000 | Mikame | ........................ | 701/455 |
| 6,356,835 B2 * | 3/2002 | Hayashi et al. | ............... | 701/454 |
| 6,665,611 B1 * | 12/2003 | Oran et al. | ..................... | 701/472 |
| 6,675,092 B1 * | 1/2004 | Katayama et al. | ............ | 701/410 |
| 6,876,923 B2 * | 4/2005 | Tsurumi | ....................... | 701/532 |
| 7,006,915 B2 * | 2/2006 | Quartier | ........................ | 701/409 |
| 7,412,327 B2 * | 8/2008 | Kauvo et al. | .................. | 701/420 |
| 7,620,496 B2 * | 11/2009 | Rasmussen | .................... | 701/455 |
| 7,646,473 B1 * | 1/2010 | Ramsey et al. | .............. | 356/4.01 |
| 7,765,063 B2 * | 7/2010 | Okamoto | ...................... | 701/438 |
| 7,822,426 B1 * | 10/2010 | Wuersch | .................... | 455/456.1 |
| 8,060,254 B2 * | 11/2011 | Myeong et al. | .............. | 700/253 |

(Continued)

FOREIGN PATENT DOCUMENTS

| | | |
|---|---|---|
| KR | 20070120085 A | 12/2007 |
| KR | 1020070116418 A | 12/2007 |

(Continued)

*Primary Examiner* — Kibrom K Gebresilassie
(74) *Attorney, Agent, or Firm* — Ladas & Parry LLP

(57) ABSTRACT

Disclosed herein is a method of generating a digital interior map. The method includes applying a coordinate system for a drawing of an interior of a structure using an electronic device, extracting center coordinate information of each sectional space of the interior of the structure and entrance coordinate information of entrances between floors and from an outside, generating, in the drawing, a circulation path in the interior of the structure, extracting interest points at preset intervals along the circulation path in the interior of the structure, and setting coordinate information and attribute information of each of the interest points.

12 Claims, 8 Drawing Sheets

(56) References Cited

U.S. PATENT DOCUMENTS

| | | | |
|---|---|---|---|
| 8,134,465 B2* | 3/2012 | Fujiwara et al. | 340/572.1 |
| 8,315,737 B2* | 11/2012 | Hyung et al. | 700/251 |
| 8,320,939 B1* | 11/2012 | Vincent | 455/456.1 |
| 8,392,457 B1* | 3/2013 | Bender et al. | 707/791 |
| 8,411,113 B1* | 4/2013 | Cornell et al. | 345/629 |
| 8,477,152 B2* | 7/2013 | Kim et al. | 345/619 |
| 8,504,288 B2* | 8/2013 | Kadous et al. | 701/433 |
| 8,626,198 B2* | 1/2014 | Das et al. | 455/456.3 |
| 8,761,810 B2* | 6/2014 | Farris | 455/457 |
| 8,773,946 B2* | 7/2014 | Padmanabhan et al. | 367/7 |
| 9,008,685 B1* | 4/2015 | Gold et al. | 455/456.1 |
| 2002/0072881 A1* | 6/2002 | Saitta | 703/1 |
| 2002/0152127 A1* | 10/2002 | Hamilton et al. | 705/26 |
| 2002/0158916 A1* | 10/2002 | Gusler et al. | 345/850 |
| 2003/0132862 A1* | 7/2003 | Kurosawa | 340/995.1 |
| 2005/0024361 A1* | 2/2005 | Ikeda et al. | 345/441 |
| 2005/0035883 A1* | 2/2005 | Kameda et al. | 340/995.1 |
| 2005/0093860 A1* | 5/2005 | Yanagisawa et al. | 345/419 |
| 2006/0206264 A1* | 9/2006 | Rasmussen | 701/212 |
| 2007/0027612 A1* | 2/2007 | Barfoot et al. | 701/117 |
| 2007/0103461 A1* | 5/2007 | Suzuno et al. | 345/419 |
| 2007/0244671 A1* | 10/2007 | Iyangar | 703/1 |
| 2007/0293985 A1* | 12/2007 | Myeong et al. | 700/245 |
| 2008/0189166 A1* | 8/2008 | Brooks | 705/10 |
| 2009/0027418 A1* | 1/2009 | Maru et al. | 345/629 |
| 2009/0043504 A1* | 2/2009 | Bandyopadhyay et al. | 701/213 |
| 2009/0092289 A1* | 4/2009 | Rye | 382/113 |
| 2009/0198443 A1* | 8/2009 | Yamazaki | 701/210 |
| 2009/0226113 A1* | 9/2009 | Matsumoto et al. | 382/284 |
| 2009/0267768 A1* | 10/2009 | Fujiwara et al. | 340/572.1 |
| 2009/0281661 A1* | 11/2009 | Dooley et al. | 700/258 |
| 2009/0292394 A1* | 11/2009 | Hyung et al. | 700/251 |
| 2009/0325595 A1* | 12/2009 | Farris | 455/456.1 |
| 2009/0325606 A1* | 12/2009 | Farris | 455/456.3 |
| 2010/0161225 A1* | 6/2010 | Hyung et al. | 701/301 |
| 2011/0043373 A1* | 2/2011 | Best et al. | 340/825.49 |
| 2011/0210843 A1* | 9/2011 | Kummetz | 340/517 |
| 2011/0264362 A1* | 10/2011 | Van Raamsdonk et al. | 701/200 |
| 2011/0269479 A1* | 11/2011 | Ledlie | 455/456.1 |
| 2012/0163662 A1* | 6/2012 | Lee et al. | 382/103 |
| 2012/0166960 A1* | 6/2012 | Salles | 715/738 |
| 2012/0172052 A1* | 7/2012 | Jeong | 455/456.1 |
| 2012/0173204 A1* | 7/2012 | Padmanabhan et al. | 703/1 |
| 2012/0265373 A1* | 10/2012 | Ingvalson et al. | 701/4 |
| 2012/0274642 A1* | 11/2012 | Ofek et al. | 345/441 |
| 2013/0099968 A1* | 4/2013 | Katz | 342/357.65 |
| 2013/0183924 A1* | 7/2013 | Saigh et al. | 455/404.2 |
| 2014/0053077 A1* | 2/2014 | Unnikrishnan et al. | 715/747 |
| 2014/0365980 A1* | 12/2014 | Morrison et al. | 715/863 |

FOREIGN PATENT DOCUMENTS

| | | |
|---|---|---|
| KR | 1020090105745 A | 10/2009 |
| WO | 2006/110181 A2 | 12/2006 |

* cited by examiner

METHOD FOR GENERATING DIGITAL INTERIOR MAP

CROSS REFERENCE TO RELATED APPLICATION

This application claims the benefit of Korean Patent Application No. 10-2010-0133933, filed on Dec. 23, 2010, which is hereby incorporated by reference in its entirety into this application.

BACKGROUND OF THE INVENTION

1. Technical Field

The present invention relates generally to technology for the fabrication of a digital map that is used in navigation and augmented reality and, more particularly, to technology that is capable of efficiently generating a digital map in an area to which it is not easy to apply a common method of generating a digital map, such as the interior of a building, and providing walkers with the convenience of using navigation indoors as well as outdoors.

2. Description of the Related Art

With the development of communication technology, such as satellite communication technology, the popularity of vehicle navigation services has become widespread. Furthermore, new types of digital map-based services which combine photos and digital maps, such as Google Earth, Google Street View, Daum Road View and Naver Street View, have also been increasing.

Furthermore, as the number of smart phone users and the utilization of portable laptops as well as smart phones are sharply increasing, there are a growing need for and a growing interest in a navigation service for walkers as well as a navigation service for vehicle drivers. The current navigation services for walkers, however, utilize the navigation service technology for vehicles without modification. Since digital maps for vehicle navigation are used, only road information is provided, but information about the interiors of buildings and the attribute information of the buildings are not provided to walkers. Accordingly, the current positioning technology has a location error of several tens of meters and is not suitable for providing a navigation service for walkers.

Accordingly, it is not significantly difficult for a walker to find a destination building using current navigation services, but needs to find a desired location within a building by viewing the guide map for each floor or searching the Internet.

Accordingly, in order to provide a navigation service for walkers inside the interior of a large building, accurate positioning technology must be developed and also digital interior maps should be provided. Furthermore, in light of the characteristics of an indoor navigation service, a digital interior map needs to provide not only basic location information but also attribute information, such as information about the name and type of each store, and information about equipment for moving within each building (e.g., emergency exits, stairs, elevators, escalators, and moving walks).

SUMMARY OF THE INVENTION

Accordingly, an object of the present invention is to efficiently fabricate a digital interior map and also provide a digital interior map having highly accurate map information.

Another object of the present invention is to provide technology that is capable of increasing effectiveness and utilization by providing the attribute information of each space when providing a digital map so that a walker can easily check interior information when using a navigation service.

In order to accomplish the above objects, the present invention provides a method of generating a digital interior map, including applying a coordinate system for a drawing of an interior of a structure; extracting center coordinate information of each sectional space of the interior of the structure and entrance coordinate information of entrances between floors and from an outside; generating, in the drawing, a circulation path in the interior of the structure; extracting interest points at preset intervals along the circulation path in the interior of the structure; and setting coordinate information and attribute information of each of the interest points.

Here, the drawing of a building may be a plan view registered in an architectural register.

The generating the circulation path in the interior of the structure may include generating circulation paths for walking, spaced apart from the boundaries of each sectional space by a preset interval, within one or more sectional spaces or areas including a corridor and a passage through which a walker may pass.

Furthermore, the generating a circulation path in the interior of the structure may include generating a circulation path for entrances along centers of entrances between the floors and from the outside; and connecting the circulations path for walking and the circulation path for entrances.

The extracting coordinate information may include setting one point of the drawing as a reference point; and forming an orthogonal coordinate system based on the reference point.

Here, the center coordinate information, the entrance coordinate information, and the coordinate information of the interest points may each include coordinate information, floor information, and azimuth information based on the orthogonal coordinate system.

The extracting coordinate information may include extracting coordinate information of a center point of a rectangle, including each of the sectional spaces, as the center coordinate information of the sectional space; and extracting coordinate information of a center point of the entrance as the entrance coordinate information of the entrance.

The attribute information of the interest point may include information about another floor and information about one or more external structures that are connected to the entrance adjacent to the interest point.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
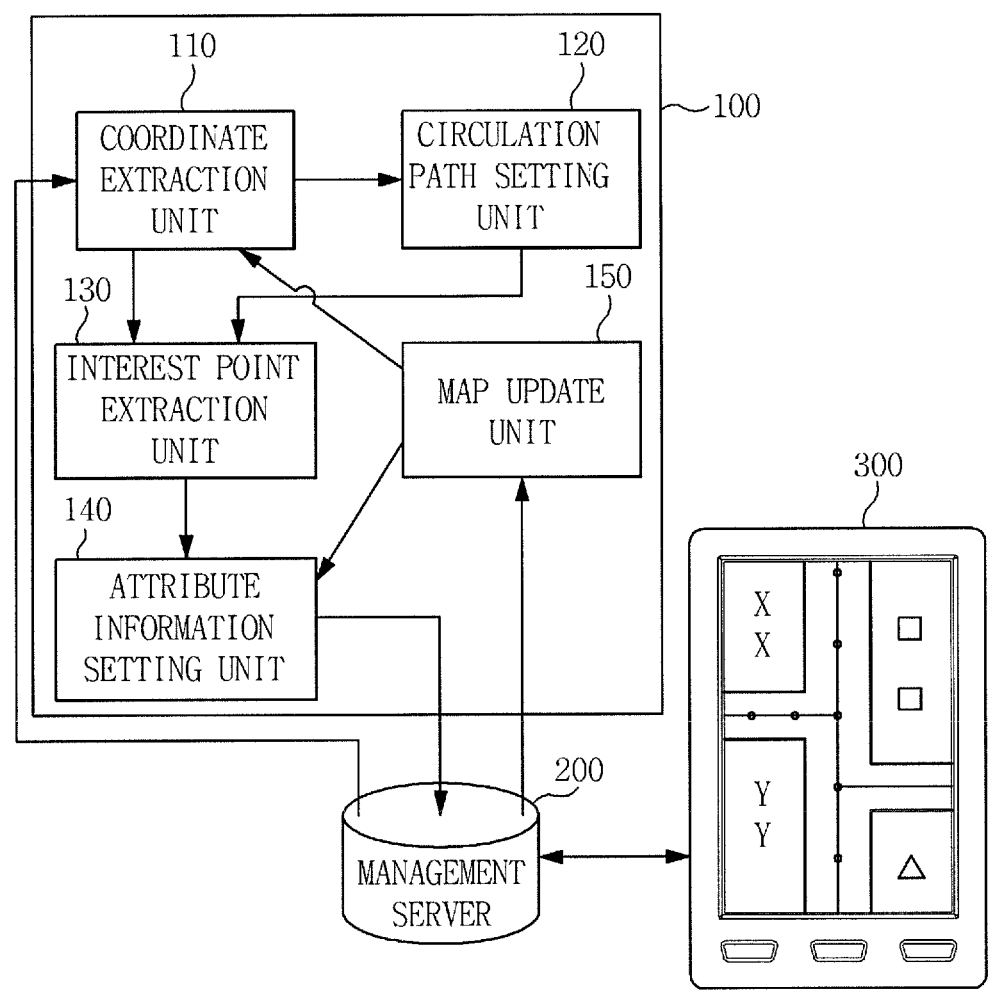
FIG. 1 is a block diagram showing an apparatus for generating a digital interior map according to an embodiment of the present invention.

Reference now should be made to the drawings, in which the same reference numerals are used throughout the different drawings to designate the same or similar components.

FIG. 1 is a block diagram showing an apparatus 100 for generating a digital interior map according to an embodiment of the present invention. The following description given in conjunction with FIG. 1 is a description of an example of the apparatus for implementing a method of generating a digital interior map according to the embodiment of the present invention. It will be apparent that the characteristics of an invention related to the method of generating a digital interior map that will be described with reference to FIG. 8 include the characteristics set forth in the following description given in conjunction with FIG. 1.

Referring to FIG. 1, the apparatus 100 for generating a digital interior map according to the embodiment of the present invention includes a coordinate extraction unit 110, a circulation path setting unit 120, an interest point extraction unit 130, and an attribute information setting unit 140.

The coordinate extraction unit 110 receives data about a drawing of the interior of a structure from a management server 200. The drawing of the interior of a structure is a drawing that is used to build and manage a structure such as a building.

The structure, such as a building, may be a structure that has a single floor or a plurality of floors above and/or below the ground. In this case, the drawing of the interior of a structure is a plan view of each floor, and therefore a plurality of drawings of a plurality of floors may be provided for each structure. Accordingly, a digital map may be created by analyzing drawings of respective floors of a building.

The coordinate extraction unit 110 applies a coordinate system on the drawing of the interior of the structure. Furthermore, the coordinate extraction unit 110 extracts information about the center coordinates of each sectional space of the interior of the structure and information about the entrance coordinates of each entrance between floors or from the outside based on the applied coordinate system.

Each sectional space is an independent space that is sectioned based on functionality, such as an office, a store, a restroom or a warehouse, or the owner, and that is disposed in the drawing of the interior of the structure. Alternatively, each sectional space is an independent space that corresponds to the unit of the sale and trade of a structure, and may be a space that is indicated by solid lines in the drawing of the interior of the structure.

The entrance is a space, such as a staircase, an elevator, an escalator, an emergency exit, or an entrance between floors or to a building or from the outside, which is disposed on the drawing of the interior of the structure. A door that is used to enter into or exit from the above-described space may be set as the entrance.

The coordinate extraction unit 110 extracts information about the center coordinates of the sectional space and the entrance coordinates of the entrance. In order to perform the extraction, the coordinate system is applied first when the drawing of the interior of the structure is received.

In this embodiment of the present invention, applying a coordinate system means applying the X and Y axes and a reference point of an orthogonal coordinate system and an azimuth system for measuring azimuth angles. Accordingly, the coordinate information described below may include coordinate point information based on an orthogonal coordinate system, floor information, obtained from the drawing of the interior of the structure, and azimuth information.

For example, the center point of a minimum rectangle embracing a drawing of the interior of a structure may be set as a reference point. That is, the center point of a structure is set as the reference point. Furthermore, when north in terms of an azimuth or the Y axis in terms of the shape of a building must be set as the reference point (e.g., if a building has a rectangle facing the northwest, the direction of one side of the rectangle), the set direction is set as the Y axis. The direction orthogonal to the Y axis may be naturally set as the X axis.

The azimuth system may be set such that angles measured clockwise from the reference point based on the magnetic north are measured as azimuth angles.

In this embodiment of the present invention, a center point for information about the center coordinate of a sectional space is set in a way similar to the method of setting the reference point. That is, a minimum rectangle embracing each sectional space is set, and information about the coordinates of the center point of the set rectangle is extracted as information about the center coordinates of the sectional space.

In the case of the entrance, information about the coordinates of the center point of the entrance may be entrance coordinate information. For example, in the case of the elevator, the center point of a single line, indicating an elevator entrance (i.e., an external wall door) that is indicated on the drawing of the interior of the structure, may be elevator coordinate information. In the case of the stair, the center point of a single line, indicating an entrance door to the staircase, may be stair coordinate information.

The circulation path setting unit 120 generates interior circulation paths for walking in the drawing of the interior of the structure. In this embodiment of the present invention, circulation paths are divided into circulation paths for walking and circulation paths for entrance.

The circulation paths for walking are circulation paths that are generated in an area where a walker may walk between sectional spaces in the drawing of the interior of the structure, other than regions including an entrance between floors and/or an entrance from the outside, such as a staircase. For example, a commercial building may have sectional spaces in which stores are densely disposed and sectioned in each floor. Circulation paths for walking are provided between the sectional spaces. Such circulation paths function to indicate areas, including corridors and passages, across which walkers can walk across the interior of each floor of the building (other than the interiors of the sectioned spaces).

In this embodiment of the present invention, the circulation paths for walking may be spaced apart from the external walls of sectional spaces (i.e., spaces indicated as sectional spaces on the drawing of the interior of the structure) by a preset interval (e.g., by a real distance of 0.5 meters from wall surfaces and sectional space indication lines on the drawing). Furthermore, such a circulation path for walking may be spaced apart from the boundary wall of a building by a preset interval. The reason for this is that a passage may be formed right in the boundary wall of the building.

Accordingly, in general, the circulation paths for walking may be generated on both sides of each passage or corridor. Furthermore, if the circulation paths for walking are generated as described above, the circulation paths for walking may generally form a plurality of closed loops.

However, there is a case in which circulation paths for walking may not be generated on both sides of a passage because the width of the passage is narrow. For example, there may be a case in which the width of a passage is 0.9, but a preset interval is 0.5 meters away from a sectional space. In this case, circulation paths for walking cannot be generated on both sides of the passage, and therefore a circulation path for walking is generated in a single line along the center of the passage.

In general, circulation paths for walking are not applied to the interior of a sectional space. However, a circulation path for walking may be generated in the internal space of a sectional space based on the arrangement of furniture or the like within the sectional space according to user input or selection. When a circulation path for walking is generated in the internal space of a sectional space, the actual inspection of the interior of the sectional space may be required.

A circulation path for walking may also be applied to the outdoor terrace or rooftop of a building when a sectional space is the outdoor terrace or rooftop of the building. The reason for this is that the outside terrace or rooftop may be indicated on a drawing of the interior of a structure and also a walker can pass through the space. A circulation path for walking may also be extended into and generated in an outdoor parking lot connected to the entrance of a building or an outdoor walker passage adjacent to a building. Accordingly, the operation in conjunction with conventional navigation may be possible.

The circulation path setting unit 120 also generates a circulation path for entrances. The circulation path for entrances is a circulation path for a walker's passage between floors or a walker's passage from the outside of a building. In this embodiment of the present invention, the circulation path for an entrance is generated in a single line along the center of an entrance/exit passageway (e.g., a passage such as a staircase or an escalator). The circulation path for an entrance may overlap a circulation path for an entrance for a higher floor or a lower floor connected to a floor on the drawing of the interior of the structure.

The circulation path for entrances and the circulation paths for walking may be naturally interconnected when they are generated. In this manner, the generation of the circulation path has been completed. The circulation path in the interior of the structure may be indicated on the drawing of the interior of the structure in the form of an image, or may be stored in the form of data independently of the data about the drawing of the interior of the structure.

The interest point extraction unit 130 functions to extract interest points at preset intervals along the circulation path in the interior of the structure. Accordingly, the interest point extraction unit 130 receives the drawing of the interior of the structure or data about the circulation path from the coordinate extraction unit 110 and the circulation path setting unit 120.

In the case of a circulation path for walking, the interest point extraction unit 130 may extract interest points at preset intervals (e.g., 1 meter) along a closed loop that is formed by the circulation path for walking. In this case, the interest point extraction unit 130 may allocate an identification number, such as a unique number, to each of the interest points.

In the case of the circulation path for an entrance, a method of extracting interest points at preset intervals (e.g., 1 meter) based on a point connected to the circulation path for walking may be used. A unique number may also be allocated to each of the interest points extracted along the circulation path for an entrance. If an interest point on the drawing of the interior of a floor overlaps an existing interest point of a higher floor or a lower floor, it may not be extracted in order to reduce the unnecessary consumption of data storage capacity.

In addition to the method of extracting interest points, another method for extracting interest points along the circulation path for an entrance and along the circulation path for walking at different intervals may also be used. Such interest points are points that are references for recording information about a structure, and may be extracted using any type of method that is capable of performing the above-described function.

When interest points are extracted, respective pieces of attribute information to be described later do not need to be consecutively set along the circulation path one by one. In other words, information can be efficiently managed because only attribute information about a limited number of interest points has to be managed.

The attribute information setting unit 140 functions to set coordinate information and attribute information of interest points. In this embodiment of the present invention, various functions of a digital map are derived from the attribute and coordinate information of interest points.

The coordinate information of each interest point may be set in accordance with the coordinate system and the coordinate information format set by the coordinate extraction unit 110. Furthermore, accurate coordinate information can be set by using the numerical and scale information of the drawing.

After setting coordinate information for each interest point, the attribute information setting unit 140 compares the coordinate information of interest points with the coordinate information of the sectional spaces and the entrance coordinate information of the entrance, which are extracted by the coordinate extraction unit 110. For example, the attribute information setting unit 140 may calculate the distance between the coordinate information of an interest point and the center coordinate information of a sectional space or the entrance coordinate information of an entrance.

Thereafter, the attribute information setting unit 140 determines a sectional space or an entrance adjacent to each interest point. For example, a sectional space or an entrance having the shortest calculated distance to each interest point is determined. Here, the sectional space or the entrance adjacent to the interest point may typically have a one-to-one relationship with the interest point, but may have a many-to-one or one-to-many relationship.

Thereafter, the attribute information setting unit 140 inputs information about the sectional space or entrance adjacent to the interest point as the attribute information of the interest point. That is, the attribute information of the interest point is the attribute information of the sectional space or entrance adjacent to the interest point.

The attribute information of the sectional space may include one or more pieces of information, such as the name, type, contact information, name of a representative, homepage link, and details of service of the business of the sectional space. That is, all pieces of information, other than information about the location of the sectional space, may become attribute information. The attribute information of the entrance may include information about another floor connected to the entrance and information about external structures. The external structures may be, for example, a sidewalk and a parking lot.

The attribute information setting unit 140 records information about an adjacent sectional space or entrance at each interest point, thereby completing the digital interior map. That is, in the digital interior map, a walker may pass through an interest point while walking along a circulation path. In this case, the walker may not only check his or her location information based on the results of the analysis of coordinate information using a screen 300, but also easily obtain information about a sectional space seen by the walker or a sectional space adjacent to the walker based on attribute information recorded at the interest point.

Additional information may also be recorded using the attribute information setting unit 140 by the input of a supplier based on actual inspection on the basis of the circulation paths for walking, the circulation path for entrances and the interest points.

In another embodiment of the present invention, the apparatus 100 for generating a digital interior map may further include a map update unit 150 for updating a drawing or attribute information periodically or whenever input is performed by the management server 200.

The map update unit 150 functions to update the coordinate information and the attribute information based on information, obtained by actual inspection and the input of a new drawing, and information about a change in the structure of a building. In general, the type of business of a sectional space may be updated whenever it is determined by actual inspection that the type of business is changed, or the map may be updated whenever a structure is changed by the internal repair of a building.

Figure 2:
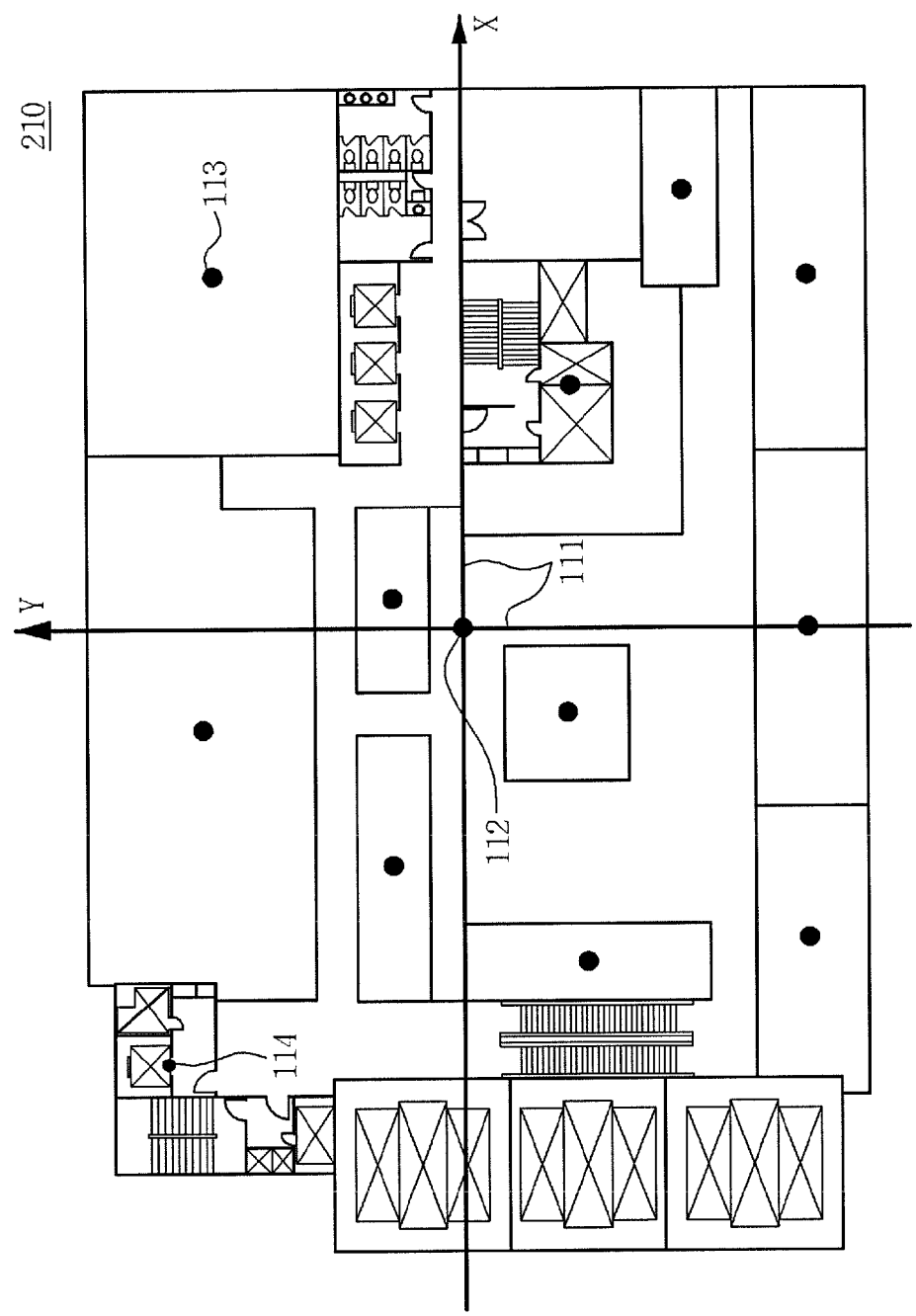
FIG. 2 shows an example in which a coordinate system is applied and the center point of each sectional space and the center point of an entrance are set in an interior drawing.

FIG. 2 shows an example in which a coordinate system is applied and the center points of each sectional space and an entrance are set in an interior drawing. Descriptions identical to portions of the description of FIG. 1 will be omitted here.

Referring to FIG. 2, there is shown a drawing 210 of the interior of the structure which is a plan view of one floor of a building. The coordinate extraction unit 110 may receive the drawing 210 from the management server 200. The drawing 210 includes data that is stored in an image file or generated by a drawing writing program.

The coordinate extraction unit 110 sets a reference point 112 on the drawing. In general, the coordinate extraction unit 110 may set the center point of a building as the reference point 112. Thereafter, the coordinate extraction unit 110 sets an orthogonal coordinate system 111 based on the reference point 112. In the orthogonal coordinate system 111, the direction of magnetic north may be set as the Y axis based on the direction in which the building is oriented, or the direction of one side of the building may be set as the Y axis based on the shape of the building. An azimuth angle refers to the direction of clockwise rotation from magnetic north.

Once the coordinate system is generated, the center coordinate information of each sectional space and the entrance coordinate information of each entrance are generated. The center coordinate information of the sectional space refers to information about the coordinates of the center point 113 of a minimum rectangle embracing the sectional space, and the entrance coordinate information of the entrance refers to information about the coordinates of the center point 114 of the entrance.

Figure 3:
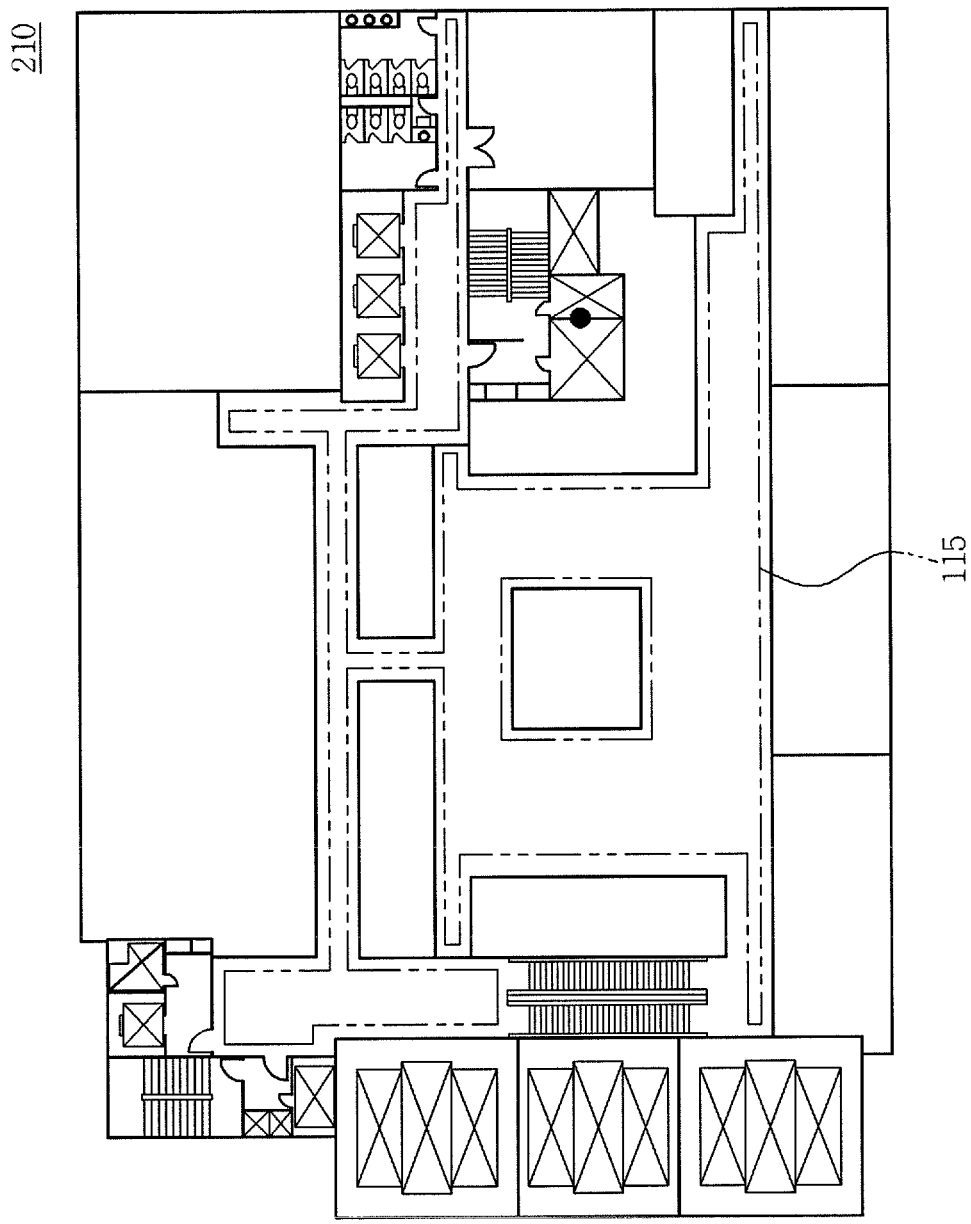
FIGS. 3 and 4 show examples in which the circulation path of the interior of a structure is generated.
Figure 4:
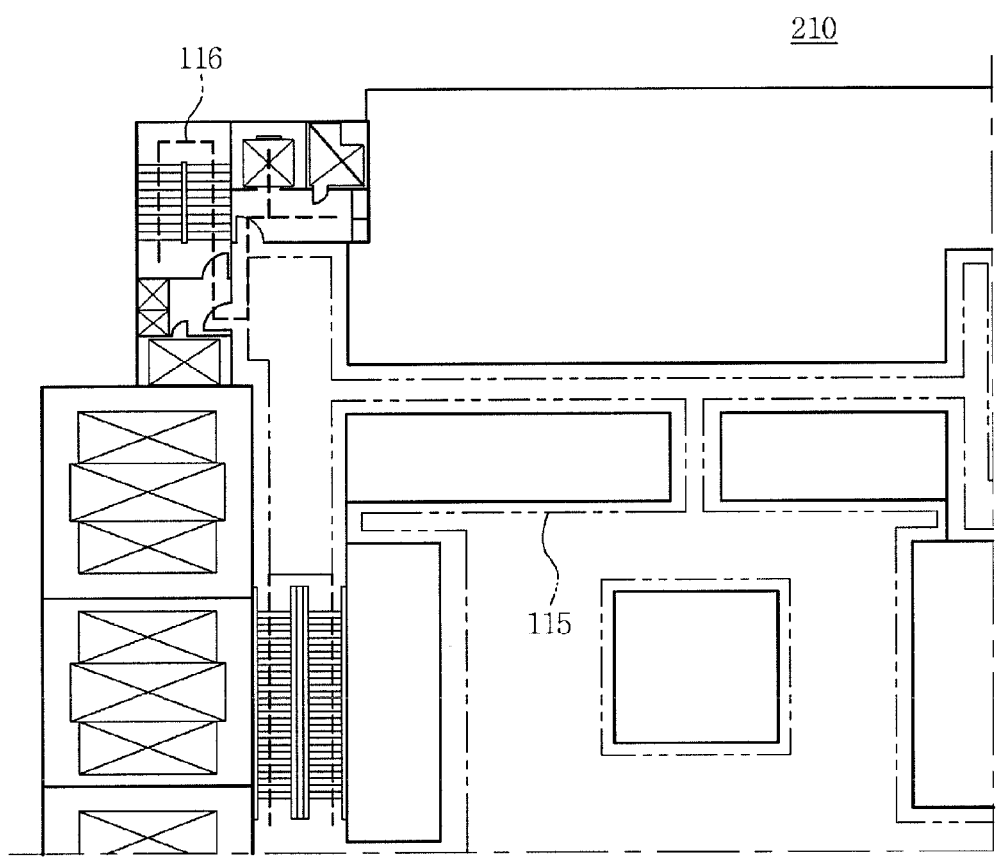

FIGS. 3 and 4 show examples in which the circulation path in the interior of the structure is generated.

From FIG. 3, it can be seen that a plurality of closed loops has been generated on a drawing 210. For reference, the drawing 210 used in the circulation path setting unit 120 may be a drawing on which a coordinate system, center coordinate information, and entrance coordinate information extracted by the coordinate extraction unit 110 have been drawn, or may be a first input drawing.

Circulation paths for walking 115 refer to the above-described closed loops. Since circulation paths for walking 115 are spaced apart from the boundaries of sectional spaces by a preset interval, a plurality of closed loops is formed, as shown in FIG. 3.

Referring to FIG. 4, it can be seen that a circulation path for entrances 116 is formed on the drawing 210 in a single line in addition to the circulation paths for walking 115. The circulation path for entrances 116 is a single line that is formed along the center of an entrance/exit passage formed for each entrance. Finally, the circulation path for entrances 116 will be connected to the circulation paths for walking 115, thereby generating the circulation path in the interior of the structure.

Figure 5:
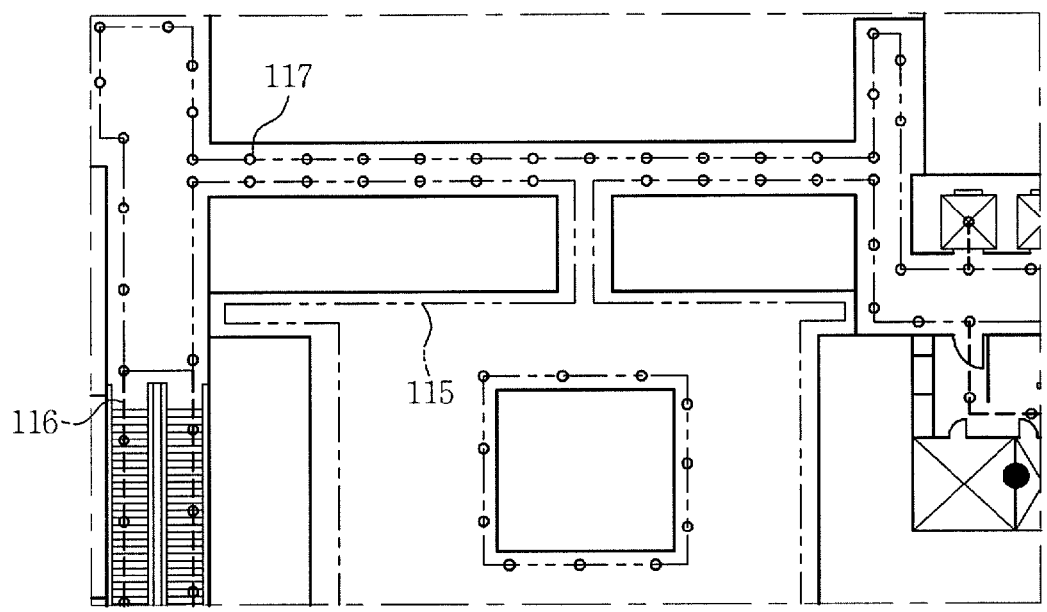
FIG. 5 shows an example in which interest points are extracted.

FIG. 5 shows an example in which interest points are extracted.

Referring to FIG. 5, it can be seen that interest points 117 have been extracted from some of the circulation paths 115 and 116 of the interior of the structure. However, the interest points 117 will be extracted from all the circulation paths 115 and 116 of the interior of the structure, and a unique number, coordinate information and attribute information will be generated for each of the interest points 117. The interest points 117 may be extracted at regular intervals or arbitrary intervals along the circulation paths 115 and 116 of the interior of the structure.

Figure 6:
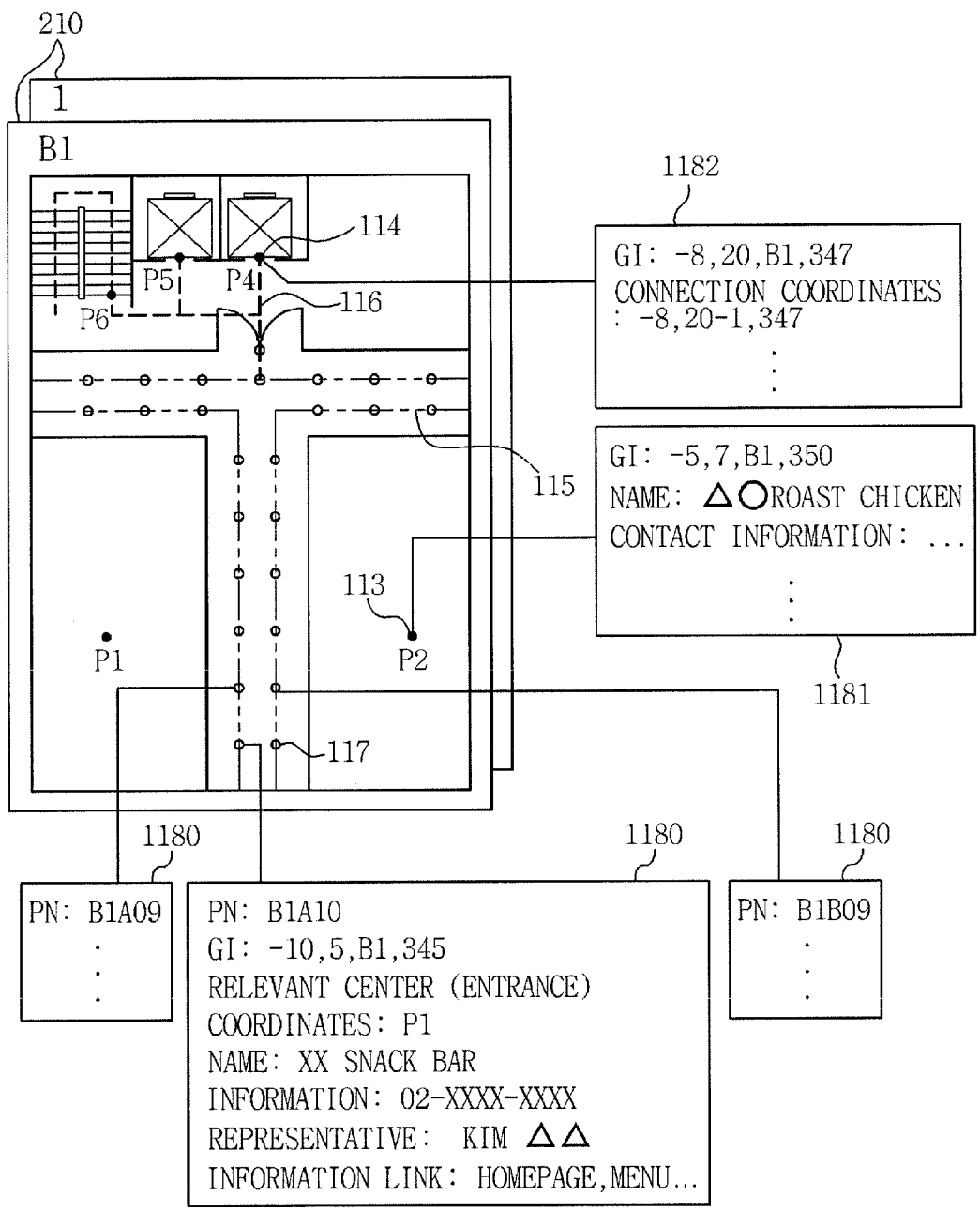
FIG. 6 shows an example of the configuration of the attribute information of respective interest points.

FIG. 6 shows an example of the configuration of the attribute information of each interest point.

Referring to FIG. 6, there is shown a plurality of drawings 210. Each drawing 210 is a plan view of each floor of a building. For better understanding, center points P1, P2, P4, P5, and P6 (113 and 114), the circulation paths of the interior of the structure 115 and 116 and the interest points 117 are drawn on a drawing 210. However, the center points P1, P2, P4, P5, and P6 (113 and 114), the circulation paths of the interior of the structure 115 and 116 and the interest points 117 may not be drawn on the drawing, but may exist in the form of data. For example, the drawing 210 of FIG. 6 may be the screen of the development tool of a digital map developer.

Referring to FIG. 6, information 1181 and 1182 about the center points P1, P2, P4, P5, and P6 (113 and 114) are shown. The information 1181 about the center point 113 of a sectional space may include the coordinate information (e.g., GI) of the center point 113 of the sectional space. In the example of FIG. 6, a plurality of pieces of coordinate information is set as the coordinate information GI, included in the information 1181, in the order of X-axis coordinate information, Y-axis coordinate information, floor information and azimuth information. Furthermore, attribute information, such as the name, type, contact information and representative of a business that occupies the sectional space, may be included in the information 1181.

Entrance coordinate information GI may be given for the information 1182 about the entrance 114 in the same format as that for the information 1181. The entrance coordinate information GI may include connection coordinates, that is, information about the location of a floor that may be connected to the entrance 114.

Each of the interest points 117 will now be described. Information 1180 that may be included is given at each interest point 117. The information 1180 of FIG. 6 may include a unique number PN that is allocated when the interest point extraction unit 130 extracts the interest point 117.

Furthermore, the coordinate information GI of the interest point 117 is given in the same format as the center coordinate information and the entrance coordinate information. The information 1180 further includes information about a point P1 that is indicated by center coordinate information or entrance coordinate information adjacent to the interest point 117.

The attribute information of the point P1 (i.e. relevant center coordinates) becomes attribute information about the interest point 117. That is, the attribute information of a sectional space, having the point P1 adjacent to the interest point 117 as the center point, becomes the attribute information of the interest point 117 in FIG. 6. For example, the attribute information of the interest point 117 may include information about the name, contact information, representative, homepage link and details of a business.

Figure 7:
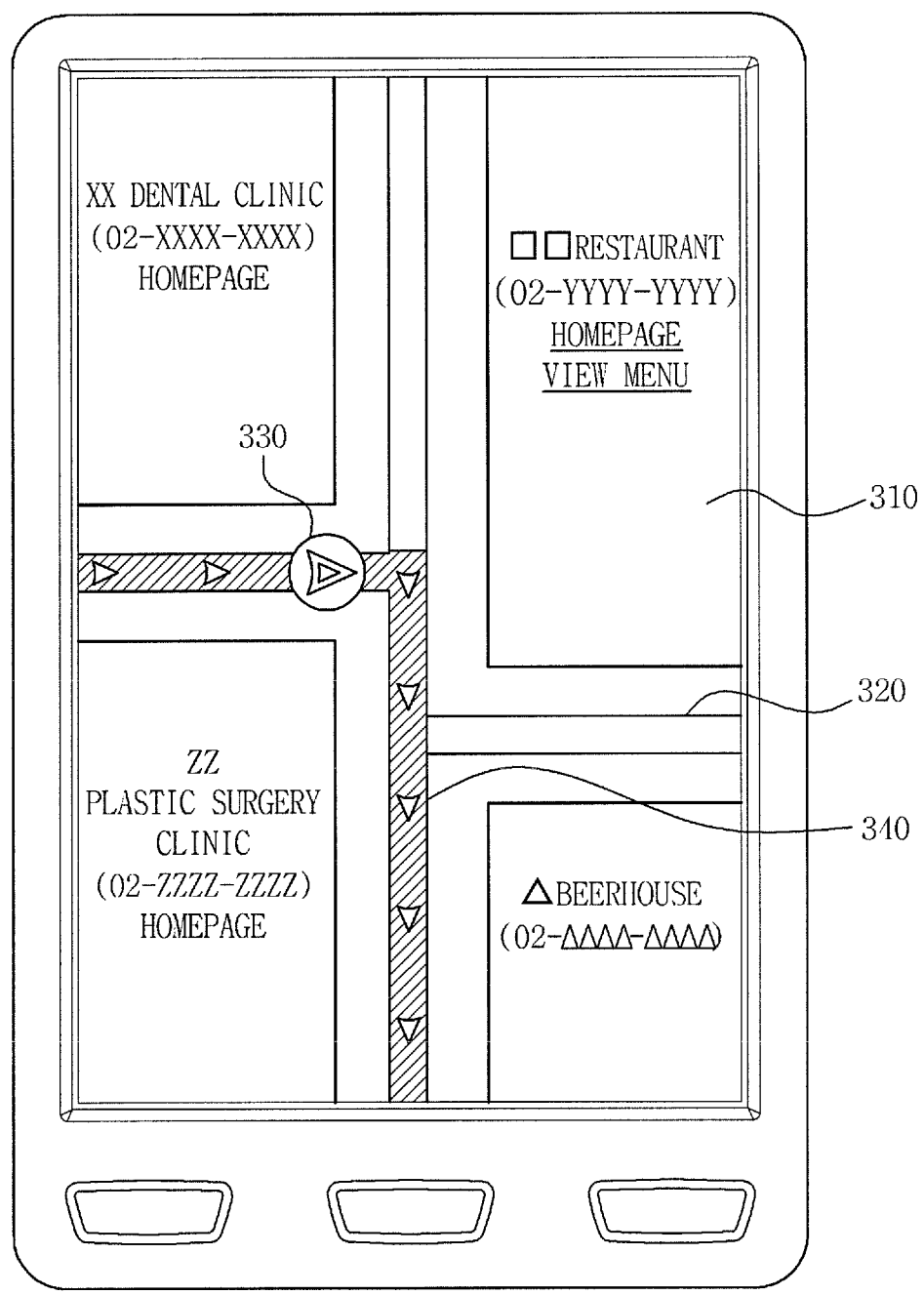
FIG. 7 shows an example of the screen of a digital interior map service provided according to the present invention.

FIG. 7 shows an example of a digital interior map service screen provided according to the present invention. In the following description, descriptions identical to portions of the descriptions of FIGS. 1 to 6 will be omitted here.

Referring to FIG. 7, there is shown the example in which the apparatus 100 for generating a digital interior map according to the embodiment of the present invention is used for navigation for walkers. For example, navigation for walkers may be used on the screen 300 of a smart phone.

Referring to the screen 300, a passage 320 is displayed. The passage 320 may be displayed in a single line or a plurality of lines based on the information about the circulation paths 115 and 116 of the interior of the structure.

Current location information 330 indicating the current location of a walker may be given along the passage 320. Furthermore, recommended path information 340 may also be displayed when the walker sets a destination.

The attribute information 310 of a store or the like may be displayed at each location on the screen 300. Although the attribute information 310 is displayed for each sectional space in FIG. 7, this is intended only to help understand the drawing. For example, in an embodiment of the present invention, only the attribute information of a sectional space close to the current location information 330 of a user may be displayed on the screen 300 based on the interest point 117.

Figure 8:
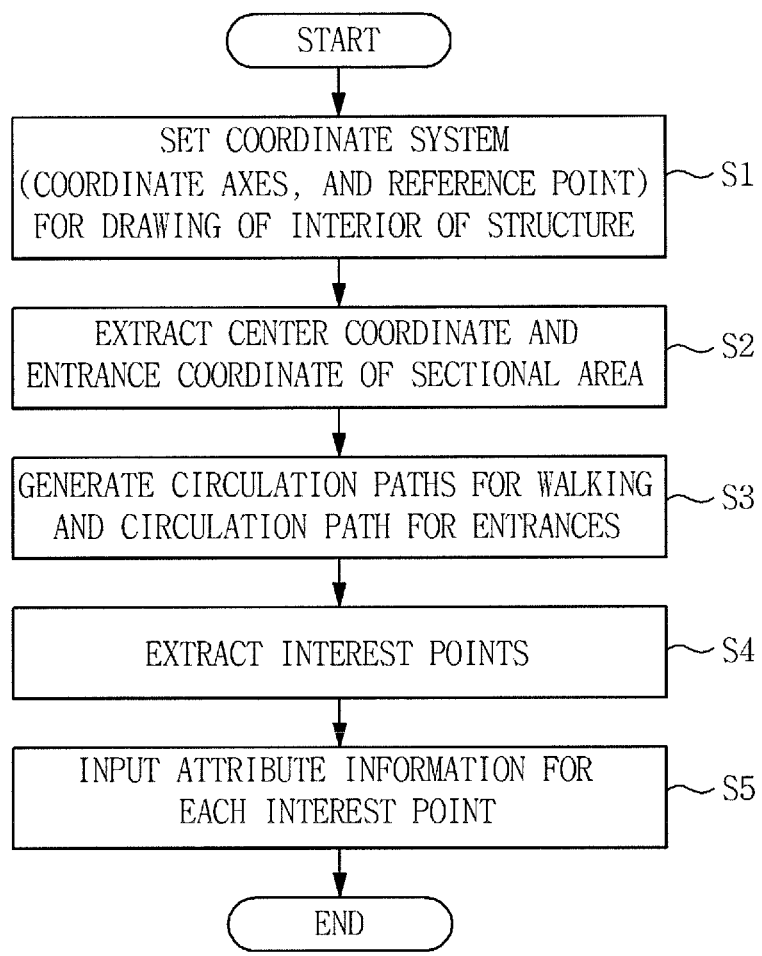
FIG. 8 is a flowchart illustrating a method of generating a digital interior map according to an embodiment of the present invention.

FIG. 8 is a flowchart illustrating a method of generating a digital interior map according to an embodiment of the present invention. Descriptions identical to portions of the descriptions of FIGS. 1 to 7 will be omitted here.

Referring to FIG. 8, in the method of generating a digital interior map according to the embodiment of the present invention, the coordinate extraction unit 110 receives a drawing of the interior of a structure from the management server 200 and then applies a coordinate system for the drawing of the interior of the structure at step S1. Thereafter, the coordinate extraction unit 110 extracts the center point of each sectional space (region) of the interior of the structure and the center point of the entrance of the sectional space and then extracts the center coordinate information of the sectional space and the entrance coordinate information of the entrance at step S2.

Thereafter, the circulation path setting unit 120 generates the circulation path in the interior of the structure at step S3. At step S3, circulation paths for walking spaced apart from the boundaries of the each sectional spaces by a preset interval are generated in the spaces between sectional spaces, such as a corridor and a passage, and a circulation path for entrances is generated along the centers of passages for entrances to another floor and the outside of the building. The circulation paths for walking are connected to the circulation path for entrances.

Thereafter, the interest point extraction unit 130 extracts interest points at preset intervals along the circulation path in the interior of the structure at step S4. Furthermore, the attribute information setting unit 140 inputs the attribute information of an adjacent sectional space or entrance for each interest point at step S5, thereby completing the digital interior map.

Furthermore, the map update unit 150 updates the drawing and the attribute information periodically or whenever data is received from the management server 200. In this case, a digital interior map may be generated anew.

As described above, according to the present invention, a digital map is generated using an actual drawing used when a building is designed or constructed. Accordingly, a digital interior map may be highly accurate, and also may be easily managed. Furthermore, the attribute information of the interior of each building can be provided using the digital interior map. As a result, there is the advantage of rendering it possible to implement an integrated navigation and information providing service, such as a service associated with a vehicle navigation service, and provide advertising effects, blogs, and social marketing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of generating a digital interior map, comprising:
    applying, in a computer system comprising a processor and a memory, a coordinate system for a drawing of an interior of a structure;
    extracting center coordinate information of each sectional space of the interior of the structure and extracting entrance coordinate information of an entrance providing a point of entry or exit to an interior of the structure from outside or an entrance providing a point of passage between floors of the structure;
    generating, in the drawing, a circulation path in the interior of the structure;
    extracting interest points at preset intervals along the circulation path in the interior of the structure; and
    setting coordinate information and attribute information of each of the interest points, and wherein
    the generating the circulation path in the interior of the structure comprises generating a circulation walking path, spaced apart from the boundaries of each sectional space by a preset interval, within one or more sectional spaces or areas including a corridor and a passage through which a walker may pass,
    generating a circulation entrance path for a walker's passage between floors or for a walker's passage from outside the structure; and
    connecting the circulation walking path and the circulation entrance path,
    wherein the circulation path in the interior of the structure comprises a plurality of closed loops and a single-line circulation path connected to the closed loops.

2. The method as set forth in claim 1, wherein the drawing of the interior of the structure is a plan view of each of the floors of the structure.

3. The method as set forth in claim 1, wherein the extracting coordinate information comprises:
    setting one point of the drawing as a reference point; and
    forming an orthogonal coordinate system based on the reference point.

4. The method as set forth in claim 3, wherein the center coordinate information, the entrance coordinate information, and the coordinate information of the interest points each comprise coordinate information, floor information, and azimuth information based on the orthogonal coordinate system.

5. The method as set forth in claim 1, wherein the extracting coordinate information comprises:
   extracting coordinate information of a center point of a rectangle, including each of the sectional spaces, as the center coordinate information of the sectional space; and
   extracting coordinate information of a center point of the entrance as the entrance coordinate information of the entrance.

6. The method as set forth in claim 1, wherein the attribute information of the interest point is information about a sectional space or an entrance adjacent to the interest point.

7. The method as set forth in claim 6, wherein the attribute information of the interest point comprises one or more of a plurality of pieces of information about a name, type of business, contact information, representative, homepage link and details of a service of the sectional space adjacent to the interest point.

8. The method as set forth in claim 6, wherein the attribute information of the interest point comprises information about another floor and information about one or more external structures that are connected to the entrance adjacent to the interest point.

9. The method as set forth in claim 1, further comprising updating the drawing or the attribute information periodically or whenever input is performed by a server.

10. The method as set forth in claim 1, wherein the circulation entrance path is generated for a walker's passage between floors of the structure.

11. The method as set forth in claim 1, wherein the circulation entrance path is generated for a walker's passage from outside the structure.

12. The method as set forth in claim 1, wherein the circulation entrance path is generated for a walker's passage between floors and for a walker's passage from outside the structure.

* * * * *